S. SACERDOTE.
STEAM COOKING APPARATUS.
APPLICATION FILED JULY 22, 1913.
1,144,002. Patented June 22, 1915.
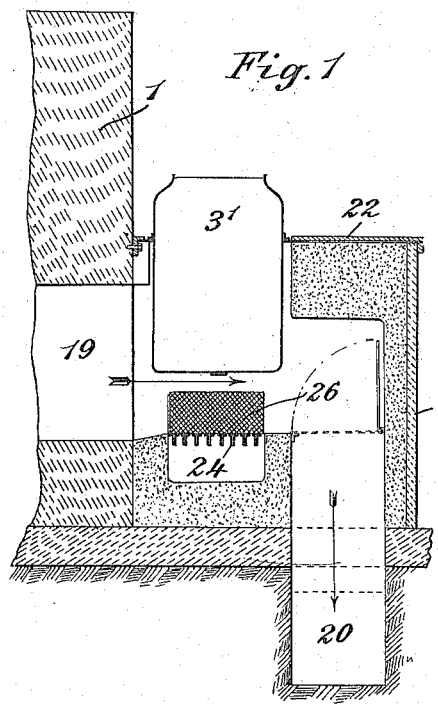
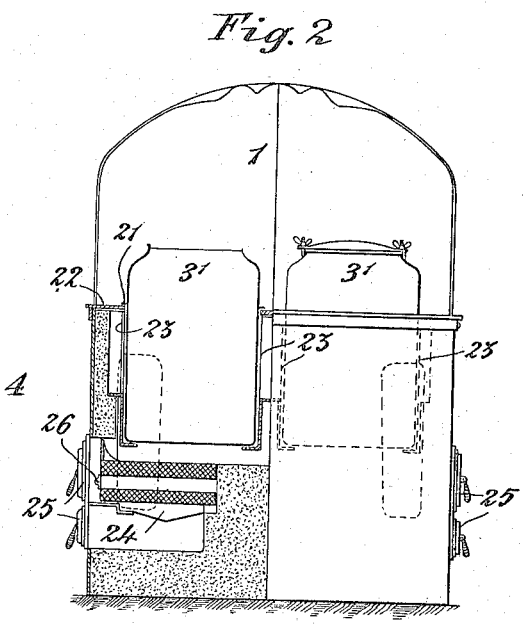
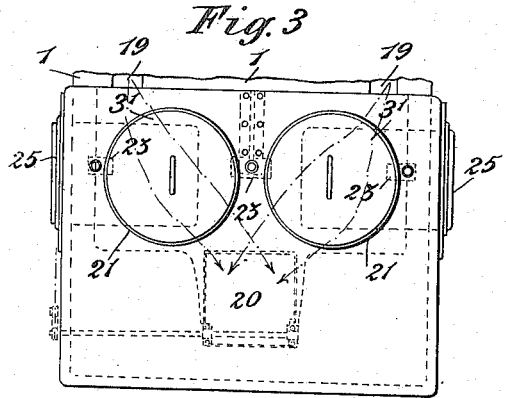
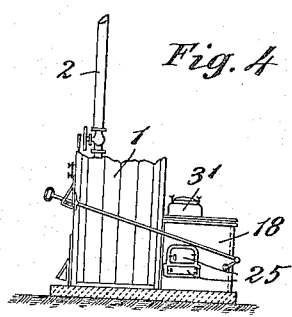
WITNESSES
Frank H Logan
Cornelius Hoving
INVENTOR,
SECONDO SACERDOTE,
By W H Berrigan
ATTORNEY.

UNITED STATES PATENT OFFICE.

SECONDO SACERDOTE, OF MILAN, ITALY.

STEAM COOKING APPARATUS.

1,144,002.   Specification of Letters Patent.   Patented June 22, 1915.

Application filed July 22, 1913.   Serial No. 780,484.

*To all whom it may concern:*

Be it known that I, SECONDO SACERDOTE, a subject of the King of Italy, residing at Milan, civil engineer, whose post-office address is 24 Via Solferino, Milan, Italy, have invented a new and useful Steam Cooking Apparatus, of which the following is a specification.

My present invention relates to the known method of cooking viands by steam in heat retaining vessels, and has for its object to provide a stationary multiple cooking apparatus for large concerns, such as hospitals, public schools, barracks, prisons, and so forth, comprising a bank of cement, brickwork or such material, having a number of cells or cavities into which the heat retaining steam cooking vessels are inserted, which form of steam cooking apparatus is characterized by the fact that both water boiling and stewing of viands without water, *i. e.* in their own gravy, (melting of fat, &c,) can be simultaneously effected.

Other objects will be mentioned by and by in the course of the specification of my invention, illustrated in the annexed drawings in which—

Figure 1 is a fragmentary sectional view of the stewing part of my steam cooking apparatus, Fig. 2 is a view of same partly in section at right angles to Fig. 1, and Fig. 3 a plan view thereof, while Fig. 4 is a total view on a smaller scale of the stewing part of my steam cooking apparatus.

In these drawings, 1 is a low pressure steam boiler the steam generated by which is led through a suitable connecting tubing 2 into the cooking vessels 3 containing viands and cold water with which it is condensed and mixed in the known way until boiling is started. The vessels 3 are placed in a corresponding number of cells or cavities in a stationary bank 4 of cement or brickwork.

One of the drawbacks of steam cooking was hitherto the fact that only water boiled viands, such as beef and broth, vegetable pottages (juliennes), noodle-soups and such like can be prepared, at least in the same apparatus which serves for water boiling, while stewing, broiling, smothering, braizing, jugging, fat melting, preparing of gravies and sauces and similar cooking operations without water could not be carried out with direct injection of steam.

The object of my present invention is to use the waste heat or combustion gases of the boilers of steam cooking apparatuses for cooking viands without water (stewing, etc.). This I obtain by completing the boiler 1 on the escapement side of the combustion gases with an additional heating member 18 (Figs. 1–4).

The combustion gases escape from chamber 19 of boiler 1, on the path indicated by arrows, to the chimney 20. The cooking vessels $3^1$ are inserted into the heater 18 through circular openings 21 of the cover plate 22. The passage of the gases from chamber 19 to the upper part of the vessel is obstructed by diaphragms at the sides of the cooking vessel $3^1$ and they are deflected, in passing to the chimney, under the bottom of the vessel which thereby is suitably heated so that the viands therein contained without water are properly stewed.

For emergency cases, for instance voluntary or involuntary stoppage of boiler, the food articles in vessel $3^1$ may be cooked by kindling a fire on grate 24 accessible from the outside through doors 25.

26 is a block of heat retaining material adapted to prevent, when the boiler 1 is in action, cold air passing through doors 25 and grate 24, and to suitably guide the passage of the hot gases under the bottom of vessel $3^1$. When using direct fire kindled on grate 24, the heat retaining block 26, of course, is removed.

When but small space is available for the cooking apparatus, the boiler 1 with heater 18 may be built adjacent to hearth 4, so as to form one body with the same, the cover plate 9 of hearth 4 for instance being coincident or of one piece with cover plate 22 of heater 18.

Having now fully described my said invention and the manner in which the same is to be performed, I declare that what I claim as my invention is:

In a cooking apparatus, the combination of a boiler; a furnace therefor; an additional heating member; a cooking vessel therein; a grate under the cooking vessel;

the furnace and heating member being provided with a passage for leading the products of combustion from the furnace under the cooking vessel; and a removable block of heat retaining material placed over said grate.

In testimony whereof I have signed my name to this specification in the presence of two subscribing witnesses.

SECONDO SACERDOTE.

Witnesses:
 GUANMERIS GIAN GRACENAY,
 BIANCHI MARIA.

Copies of this patent may be obtained for five cents each, by addressing the "Commissioner of Patents, Washington, D. C."